United States Patent [19]

Proebster et al.

[11] Patent Number: 6,025,416
[45] Date of Patent: Feb. 15, 2000

[54] TWO-COMPONENT ADHESIVE/SEALING MASS WITH HIGH INITIAL ADHESIVENESS

[75] Inventors: Manfred Proebster, Nussloch; Werner Schumacher, Karlsruhe, both of Germany

[73] Assignee: Henkel Teroson GmbH, Heidelberg, Germany

[21] Appl. No.: 08/952,406

[22] PCT Filed: May 7, 1996

[86] PCT No.: PCT/EP96/01899

§ 371 Date: Mar. 24, 1998

§ 102(e) Date: Mar. 24, 1998

[87] PCT Pub. No.: WO96/35761

PCT Pub. Date: Nov. 14, 1996

[30] Foreign Application Priority Data

May 12, 1995 [DE] Germany .......................... 195 17 452

[51] Int. Cl.⁷ .................................................. C09J 201/10
[52] U.S. Cl. ........................... 523/333; 528/33; 524/588; 524/862; 156/329; 156/327; 156/326
[58] Field of Search ............................... 528/33; 524/588; 524/862; 523/333; 156/329, 327, 326

[56] References Cited

U.S. PATENT DOCUMENTS

| | | | |
|---|---|---|---|
| 3,632,557 | 1/1972 | Brode et al. | 260/77.5 TB |
| 3,971,751 | 7/1976 | Isayama et al. | 260/37 R |
| 3,979,344 | 9/1976 | Bryant et al. | 260/18 TN |
| 4,491,650 | 1/1985 | Rizk et al. | 525/102 |
| 4,567,107 | 1/1986 | Rizk et al. | 428/425.5 |
| 4,625,012 | 11/1986 | Rizk et al. | 528/28 |
| 4,835,012 | 5/1989 | Saur | 427/266 |
| 4,960,844 | 10/1990 | Singh | 528/17 |
| 5,525,654 | 6/1996 | Podola et al. | 524/199 |

FOREIGN PATENT DOCUMENTS

| | | |
|---|---|---|
| 0 370 463 | 5/1990 | European Pat. Off. . |
| 0 370 464 | 5/1990 | European Pat. Off. . |
| 0 370 531 | 5/1990 | European Pat. Off. . |
| 0 520 426 | 12/1992 | European Pat. Off. . |
| 21 48 458 | 4/1973 | Germany . |
| 35 45 899 | 4/1987 | Germany . |
| 40 29 504 | 3/1992 | Germany . |
| 41 19 484 | 12/1992 | Germany . |
| 58/189 276 | 11/1983 | Japan . |
| 84/78221 | 5/1984 | Japan . |
| 84/78222 | 5/1984 | Japan . |
| 05/070 754 | 3/1993 | Japan . |
| 05/271 642 | 10/1993 | Japan . |
| 1 407 827 | 9/1975 | United Kingdom . |
| 2 197 326 | 5/1988 | United Kingdom . |
| WO93/05089 | 3/1993 | WIPO . |
| WO94/23768 | 10/1994 | WIPO . |

OTHER PUBLICATIONS

Din 53 273, Jul. 1977.
Din 53 284, Sep. 1979.

*Primary Examiner*—Margaret G. Moore
*Attorney, Agent, or Firm*—Ernest G. Szoke; Wayne C. Jaeschke; Stephen D. Harper

[57] ABSTRACT

Two component adhesive/sealing masses based on silane terminated prepolymers contain a component A which is a one-component, humidity hardening adhesive/sealing mass with high initial adhesiveness, and a component B which is a crosslinking agent and/or accelerator for component A are disclosed. These adhesive/sealing masses are suitable for gluing without primer parts made of metals or other materials such as aluminum, steel, glass, wood or plastics. In a particularly preferred embodiment, component B consists of a viscous, stable mixture of plasticisers, water, thickeners and other optional auxiliary substances.

25 Claims, No Drawings

TWO-COMPONENT ADHESIVE/SEALING MASS WITH HIGH INITIAL ADHESIVENESS

This invention relates to a two-component adhesive/sealant based on silane-terminated prepolymers, to a process for its production and to its use for the elastic bonding of two or more like and/or different substrates.

BACKGROUND OF THE INVENTION

In the metal-processing industry, the vehicle industry, the utility-vehicle industry and their supplier industries, in the repair of motor vehicles and in the building industry, like or different metallic and non-metallic substrates are often adhesively or sealingly joined to one another. Various one-component and two-component adhesives/sealants are already available for this purpose. One-component adhesives/sealants are generally preferred by users because no mixing or metering errors can occur in use. In the bonding of non-porous substrates, the use of one-component moisture-curing adhesives/sealants is very limited on account of their very slow curing rate. Both one-component adhesives/sealants and conventional two-component adhesives/sealants curing at room temperature are very much in need of improvement in another respect: immediately after the parts to be joined have been fitted together, they have a very poor early strength so that the joined parts first have to be mechanically fixed until the bond has developed sufficient strength.

Accordingly, the problem addressed by the present invention was to provide adhesive/sealant compositions which, immediately after application and fitting of the parts to be joined, would have such high early strength that, in almost every application, there would be no need for mechanical fixing.

DETAILED DESCRIPTION OF THE INVENTION

It has now been found that two-component adhesives/sealants based on silane-terminated prepolymers, of which component A is a one-component moisture-curing adhesive/sealant while component B is a crosslinker and/or accelerator for component A, satisfy these requirements in a surprisingly effective manner. The adhesives/sealants according to the invention not only have high early strength, they also show such favorable adhesion behavior on a number of metallic and non-metallic substrates that there is generally no need for surface preparation with a so-called primer.

Silane-terminated prepolymers in the context of the invention are polymers with molecular weights in the range from 1,000 to 50,000 which contain at least one reactive terminal group corresponding to the following formula:

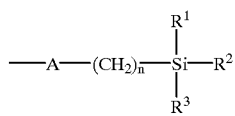

in which A is a 1.5- to 4-functional residue of a polyether, polyester, (meth)acrylate polymer, polybutadiene or polyisobutylene, n is a number of 1 to 4 and the substituents $R^1$ to $R^3$ are non-hydrolyzable $C_{1-4}$ alkyl groups and/or hydrolyzing alkoxy, acetoxy, oxime ether or amide groups. In a preferred embodiment, at least two of these substituents are hydrolyzable.

The production of moisture-curing compositions containing reactive silane groups which harden at room temperature from acrylate or methacrylate derivatives is described, for example, in JP-B-84/78221, JP-B-84/78222, U.S. Pat. Nos. 4,491,650 and 4,567,107.

In principle, the particularly preferred silane-terminated prepolymers based on polyethers may be produced in various ways:

Hydroxyfunctional polyethers are reacted with unsaturated chlorine compounds, for example allyl chloride, in an ether synthesis to form polyethers containing terminal olefinic double bonds which, in turn, are reacted with hydrosilane compounds containing hydrolyzable groups, for example $HSi(OCH_3)_3$, in a hydrosilylation reaction catalyzed, for example, by transition metals belonging to the 8th group to form silane-terminated polyethers.

In another process, the polyethers containing olefinically unsaturated groups are reacted with a mercaptosilane, for example with 3-mercaptopropyl trialkoxysilane.

In another process, hydroxyfunctional polyethers are first reacted with diisocyanates or polyisocyanates and the products of this reaction are reacted with aminofunctional silanes or mercaptofunctional silanes to form silane-terminated prepolymers.

Another method comprises reacting hydroxyfunctional polyethers with isocyanate-functional silanes such as, for example, 3-isocyanatopropyl trimethoxysilane.

These production processes and the use of the silane-terminated prepolymers mentioned above in adhesive/sealant applications are disclosed, for example, in the following patents: U.S. Pat. Nos. 3,971,751, 4,960,844, 3,979,344, 3,632,557, DE-A-40 29 504, EP-A-601 021, EP-A-370 464.

EP-A-370 463, EP-A-370 464 and EP-A-370 531 describe two-component or multiple-component adhesive compositions of which one component is a liquid organic elastomeric polymer containing at least one silane-containing reactive group per molecule and a hardener for an epoxy resin while a second component contains an epoxy resin and optionally a hardening catalyst for the silane-containing elastomeric polymer. The hardening agent for the epoxy component may be selected from any of the diamines or polyamines typically used in epoxide chemistry, carboxylic anhydrides, alcohols and phenols and optionally typical catalysts for the epoxide reaction, such as tertiary amines, salts thereof, imidazoles, dicyanodiamide, etc. Two-component systems of the type in question have the specific disadvantages of all standard two-component systems: the curing rate and the final properties of the cured adhesive depend to a very large extent on maintaining the correct mixing ratio between the components and on the thoroughness of mixing. EP-A-520 426 describes curable compositions based on oxyalkylene polymers containing silane groups which contain hollow microspheres and which can thus be processed to curable compositions of low specific gravity. According to this document, the compositions may also be used as two-component systems, in which case one component contains the oxyalkylene, the filler and the plasticizer while the second component contains filler, plasticizer and a condensation catalyst. None of these prior art documents indicates whether the compositions described therein have sufficiently high early strength to avoid the need for mechanical fixing immediately after the parts had been fitted together. In addition, there is nothing in these documents to indicate whether, in the two-component systems in question, component A which contains the silane-terminated prepolymer cures completely on its own.

In the two-component adhesives/sealants according to the invention, component A contains a prepolymer containing silane groups, fillers, plasticizers, coupling agents, flow aids, stabilizers, pigments and other typical auxiliaries and additives. For this reason, component A may be used on its own as a one-component moisture-curing adhesive/sealant which develops very high early strength immediately after the parts have been fitted together.

According to the invention, any of the silane-terminated prepolymers described above may basically be used as the reactive prepolymers containing silane groups (silane-terminated prepolymers), although the oxyalkylene polymers containing alkoxysilane groups described for the first time in U.S. Pat. No. 3,971,751 are particularly preferred. These prepolymers are commercially available from Kanegafuchi under the name of "MS-Polymer".

The plasticizers used may be selected from any of the plasticizers normally used for adhesives/sealants, for example various phthalic acid esters, aryl sulfonic acid esters, alkyl and/or aryl phosphates and dialkyl esters of aliphatic and aromatic dicarboxylic acids.

The fillers and/or pigments used may be any of the usual coated or uncoated fillers and/or pigments although they should preferably have low water contents. Examples of suitable fillers are limestone flour, natural ground chalks (calcium carbonates or calcium/magnesium carbonates), precipitated chalks, talcum, mica, clays or heavy spar. Examples of suitable pigments are titanium dioxide, iron oxides or carbon black.

In addition, component A preferably contains low molecular weight alkoxysilane compounds such as, for example, vinyl alkoxysilanes, 3-aminopropyl trialkoxy silanes, 3-glycidyloxypropyl trialkoxysilanes or combinations thereof.

In addition, component A should contain a silanol condensation catalyst (curing catalyst). Examples of such catalysts are titanic acid esters, such as tetrabutyl titanate, tetrapropyl titanate, tin carboxylates, such as dibutyl tin dilaurate, dibutyl tin maleate, dibutyl tin diacetate, tin(ll) octoate, tin naphthenate, tin alkoxylates, dibutyl tin acetyl acetonate, amino compounds such as morpholine, N-methyl morpholine, 2-ethyl-2-methyl imidazole, 1,8-diazabicyclo (5.4.0)undec-7-ene (DBU), carboxylic acid salts of these amines or long-chain aliphatic amines.

In addition, component A of the adhesives/sealants according to the invention may optionally contain additional stabilizers. "Stabilizers" in the context of the present invention are antioxidants, UV stabilizers or hydrolysis stabilizers. Examples of such stabilizers are commercially available sterically hindered phenols and/or thioethers and/or substituted benzotriazoles and/or amines of the "HALS" type (hindered amine light stabilizer). In addition, component A should have an early strength immediately after application and after parts to be joined have been fitted together of at least 0.16 N/cm$^2$ as measured in accordance with DIN 53273.

Component B of the two-component adhesives/sealants according to the invention contains a crosslinker and/or accelerator for component A. This crosslinker and/or accelerator may be, for example, one of the low molecular weight organofunctional silanes mentioned above, optionally in combination with one or more of the catalysts mentioned above. In one particularly preferred embodiment, component B contains a paste-form stable mixture of one or more plasticizers, water, one or more thickeners and optionally other auxiliaries such as, for example, fillers, thixotropicizing agents or surfactants.

Preferred thickeners for the preferred embodiment are water-soluble or water-swellable polymers or inorganic thickeners. Examples of organic natural thickeners are agar agar, carrageen, tragacanth, arabic gum, alginates, pectins, polyoses, guar flour, starch, dextrins, gelatin, casein. Examples of organic fully or partly synthetic thickeners are carboxymethyl cellulose, cellulose ethers, hydroxyethyl cellulose, hydroxypropyl cellulose, poly(meth)acrylic acid derivatives, polyvinyl ethers, polyvinyl alcohol, polyamides, polyimines. Examples of inorganic thickeners are polysilicic acids, highly disperse, pyrogenic hydrophilic silicas, clay minerals, such as montmorillonite.

Both component A and component B may optionally contain typical flow aids such as, for example, highly disperse silicas, bentones, urea derivatives, fibrillated or pulped chopped strands or castor oil derivatives.

As mentioned above, the composition of component A according to the invention is such that it cures completely on its own and gives comparable ultimate strength values to the mixture of component A and component B. Accordingly, this adhesive system is unaffected by mixing and metering errors between component A and component B so that the ratio of component A to component B can be varied within very wide limits without any effect on the ultimate strength of the adhesive bond. This is a major advantage over conventional two-component adhesives/sealants. The advantage over one-component systems is that even bonds involving non-porous substrates cure rapidly largely irrespective of atmospheric moisture. Component A and component B are mixed in a ratio of 5:1 to 15:1 parts by weight and preferably in a ratio of 8:1 to 12:1 parts by weight.

As mentioned at the beginning, the adhesives/sealants according to the invention are distinguished by the fact that the surfaces of most substrates do not require pretreatment with a primer. This applies in particular to metal substrates such as aluminium, anodized aluminium, steel (particularly stainless steel), glass, wood and a large number of plastics.

The invention is illustrated by the following Examples.

EXAMPLE 1

Production of a crosslinker/accelerator paste

39 Parts by weight of precipitated coated chalk, 53 parts by weight of an alkyl sulfonic acid ester of phenol, 7.28 parts by weight of water and 0.72 part by weight of methyl hydroxyethyl cellulose were mixed with intensive shearing in a planetary mixer until they were homogeneous.

Determination of early bond strength

The early strength of bonds was determined under a static load in accordance with DIN 53284 and DIN 53273. To this end, an anodized aluminium plate was coated with the adhesive/sealant to be tested in the form of a strand. A 200 mm long and 15 mm wide anodized aluminium strip was pressed onto the strand of adhesive/sealant in such a way that a 120 mm long, 15 mm wide and 1 mm thick joint was formed. Immediately after application of the adhesive/sealant, the aluminium plate was vertically clamped in a stand and a 300 g weight was attached to the bonded strip at its lower projecting end and the time taken for the bond to break was determined.

The one-component adhesives/sealants used for comparison were directly applied. The two-component adhesives/sealants were mixed in a static mixer and then immediately applied.

In the two-component adhesive/sealant according to the invention, the adhesive/sealant based on silane-modified polymers (MS®-Polymer, a product of Kanegafuchi) commercially obtainable under the name of Terostat 9220 (from Teroson) was used as component A and was mixed with the above-mentioned hardener/crosslinker paste as component B in a ratio of 10 parts by weight of component A to 1 part by weight of component B.

A fast two-component adhesive/sealant corresponding to the prior art (Teromix 6700, a product of Teroson) was used for comparison.

TABLE 1

Bond strengths under a load of 0.3 kg immediately after joining of the test specimens

| Adhesive/sealant | Time |
| --- | --- |
| Teromix 6700 (2C PU adhesive) | 3 secs. |
| Terostat 91 (1C PU bodywork sealant a product of Teroson) | 15 secs. |
| Terostat 930 (1C MS Universal sealant) | 25 secs. |
| Terostat 9220 (1C MS adhesive/sealant with high early strength, a product of Teroson) | 55 secs. |
| 2C adhesive/sealant according to the invention | 50 secs. |

TABLE 2

Bond strengths under a load of 0.3 kg 6 minutes after joining of the test specimens

| 2C PU adhesive | 13 secs. |
| --- | --- |
| 1C MS adhesive/sealant with high early strength | 55 secs. |
| Adhesive/sealant according to the invention | Holds |

TABLE 3

Bond strengths under a load of 1 kg 15 minutes after joining of the test specimens

| 2C PU adhesive | 30 mm slippage |
| --- | --- |
| Adhesive/sealant according to the invention | Holds |

It is clear from the above tests that the early strength of the two-component adhesive/sealant according to the invention is almost as high immediately after production of the test specimens as that of a one-component MS adhesive/sealant with high early strength. After short time, however, the bond strength of the adhesive/sealant according to the invention is considerably higher than that of the corresponding one-component material.

As can be seen from Table 2, a fast two-component PU adhesive is as incapable as a one-component adhesive/sealant based on MS polymers of holding a 0.3 kg weight whereas the adhesive/sealant according to the invention withstands this load.

It is apparent from Table 3 that, even 15 minutes after joining of the test specimens, the bond established with the 2C PU adhesive slips by 30 mm in the first minute under a load of 1 kg whereas the bond established with the adhesive/sealant according to the invention withstands this load.

What is claimed is:

1. A two component adhesive or sealant composition comprising a component A and a component B, wherein
   (I) component A is a one-component moisture-curing adhesive or sealant comprised of one or more silane-terminated polyether prepolymers, wherein the silane-terminated polyether polymers contain at least one reactive terminal group corresponding to the formula:

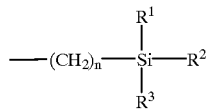

in which n is 1 to 4 and $R^1$, $R^2$ and $R^3$ are selected from the group consisting of non-hydrolyzable $C_{1-4}$ alkyl groups and hydrolyzable alkoxy, acetoxy, oxime ether and amide groups wherein at least one of $R^1$, $R^2$, ana $R^3$ is hydrolyzable; and
   (II) component B is a paste-form stable mixture comprised of at least one plasticizer, water, and at least one thickener;
   wherein component A alone or a mixture formed by mixing component A and component B has an early strength immediately after application and joining of at least 0.16 N/cm² as measured in accordance with DIN 53273.

2. The composition of claim 1 wherein at least one thickener is an organic natural thickener selected from the group consisting of agar agar, carrageen, tragacanth, arabic gum, alginates, pectins, polyoses, guar flour, starch, dextrins, gelatin and casein.

3. The composition of claim 1, wherein at least one thickener is an organic fully synthetic or partly synthetic thickener selected from the group consisting of carboxymethyl cellulose, cellulose ethers, hydroxyethyl cellulose, hydroxypropyl cellulose, poly(meth)acrylic acid derivatives, polyvinyl ether, polyvinyl alcohol, polyamides, and polyimines.

4. The composition of claim 1, wherein at least one thickener is an inorganic thickener selected from the group consisting of polysilicic acids, highly disperse silicas, pyrogenic hydrophilic silicas, and clay minerals.

5. The composition of claim 1, wherein the silane-terminated polyether prepolymers contain alkoxysilane growps.

6. The composition of claim 1, wherein at least one plasticizer is selected from the group consisting of phthalic acid esters, aryl sulfonic acid esters, alkyl phosphates, aryl phosphates, and dialkyl esters of aliphatic and aromatic dicarboxylic acids.

7. The composition of claim 1 wherein at least one of component A or component B is additionally comprised of at least one filler.

8. The composition of claim 1 wherein at least one of component A or component B is additionally comprised of at least one pigment.

9. The composition of claim 1 wherein component A is additionally comprised of at least one silanol condensation catalyst.

10. The composition of claim 1 wherein component A is additionally comprised of at least one low molecular weight alkoxysilane compound.

11. The composition of claim 1 wherein at least one of component A or component B is additionally comprised of at least one flow aid.

12. The composition of claim 1 wherein at least one of component A or component B is additionally comprised of at least one flow aid selected from the group consisting of highly disperse silicas, bentones, urea derivatives, fibrillated or pulped chopped strands, and castor oil derivatives.

13. A process for bonding two or more substrates without a primer, comprising the steps of
   (a) applying the composition of claim 1 to a first substrate to provide a free adhesive or sealant surface; and
   (b) applying a second substrate to the free adhesive or sealant surface to establish a bond, wherein the bond thus established can be immediately further processed or transported without further mechanical fixing.

14. The process of claim 13 wherein before step (a) component A is mixed with component B in a ratio of 5:1 to 15:1 parts by weight.

15. The process of claim 13 wherein at least one of the first substrate or the second substrate is comprised of metal, painted metal, glass, wood or plastic.

16. A two-component adhesive or sealant composition comprising a component A and a component B, wherein
(I) component A is a one-component moisture-curing adhesive or sealant comprised of one or more silane-terminated polyether prepolymers having a molecular weight of from 1,000 to 50,000 and containing at least one reactive terminal group corresponding to the formula

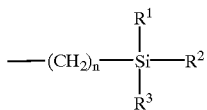

in which n is 1 to 4 and $R^1$ to $R^2$ and $R^3$ are selected from the group consisting of non-hydrolyzable $C_{1-4}$ alkyl groups and hydrolyzable alkoxy, acetoxy, axime ether and amide groups wherein at least two of $R_1$, $R^2$, and $R^3$ are hydrolyzable; and (II) component B is a paste-form stable mixture comprised of water, at least one plasticizer selected from the group consisting of phthalic acid esters, aryl sulfonic acid esters, alkyl phosphates, aryl phosphates, and dialkyl esters of aliphatic and aromatic dicarboxylic acids, and at least one thickener selected from the group consisting of agar agar, carrageen, tragacanth, arabic gum, alginates, pectins, polyoses, guar flour, starch, dextrins, gelatin, casein, carboxymethyl cellulose, cellulose ethers, hydroxyethyl cellulose, hydroxypropyl cellulose, poly(meth)acrylic acid derivatives, polyvinyl ethers, polyvinyl alcohol, polyamides, polyimines, polysilicic acids, highly disperse silicas, pyrogenic hydrophilic silicas, and clay minerals;
wherein component A alone or a mixture formed by mixing component A and component B has an early strength immediately after application and joining of at least 0.16 N/cm² as measured in accordance with DIN 53273.

17. The composition of claim 16 wherein the silane-terminated polyether prepolymers contain alkoxysilane groups.

18. The composition of claim 16 wherein at least one of component A or component B is additionally comprised of at least one filler selected from the group consisting of limestone flour, natural ground chalks, precipitated chalks, talcum, mica, clays and heavy spar.

19. The composition of claim 16 wherein at least one of component A or component B is additionally comprised of at least one pigment selected from the group consisting of titanium dioxide, iron oxides and carbon blacks.

20. The composition of claim 16 wherein component A is additionally comprised of at least one silanol condensation catalyst selected from the group consisting of titanic acid esters, tin carboxylates, tin alkoxylates, dibutyl tin acetyl acetonate, amino compounds, carboxylic acid salts of amino compounds, and long-chain aliphatic amines.

21. The composition of claim 16 wherein component A is additionally comprised of at least one stabilizer.

22. The composition of claim 16 wherein component A is additionally comprised of at least one low molecular weight alkoxysilane compound selected from the group consisting of vinyl alkoxy silanes, 3-amino propyl trialkoxy silanes, and 3-glycidyloxypropyl trialkoxysilanes.

23. A process for bonding two or more substrates without a primer, comprising the steps of
(a) mixing a component A with a component B in a ratio of about 5:1 to about 15:1 parts by weight to form a mixture;
(b) applying said mixture to a first substrate comprised of metal or painted metal to provide a free adhesive or sealant surface; and
(c) applying a second substrate comprised of metal or painted metal to the free adhesive or sealant surface to establish a bond, wherein the bond thus established can be immediately further processed or transported without further mechanical fixing;
wherein component A is a one-component moisture-curing adhesive or sealant comprised of one or more silane-terminated polyether prepolymers containing at least one reactive terminal group corresponding to the formula:

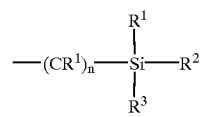

in which n is 1 to 4 and $R^1$, $R^2$, and $R^3$ are selected from the group consisting of non-hydrolyzable $C_{1-4}$ alkyl groups and hydrolyzable alkoxy, acetoxy, oxime ether and amide groups wherein at least one $R^1$, $R^2$, and $R^3$ hydrolyzable and component B is a paste-form stable mixture comprised of at least one plasticizer, water and at least one thickener.

24. The process of claim 23 wherein the ratio of component A to component B is about 8:1 to about 12:1.

25. The process of claim 23 wherein at least one of the first substrate or the second substrate is comprised of a metal selected from the group consisting of steel, stainless steel, aluminum and anodized aluminum.

* * * * *

UNITED STATES PATENT AND TRADEMARK OFFICE
CERTIFICATE OF CORRECTION

PATENT NO.     : 6,025,416
DATED          : February 15, 2000
INVENTOR(S)    : Proebster et al.

It is certified that error appears in the above-identified patent and that said Letters Patent is hereby corrected as shown below:

Column 6,
Line 2, delete "ana", and insert therefor -- and --.
Line 29, delete "growps", and insert therefor -- groups --.

Column 7,
Line 19, delete "$R_1$", and insert therefor -- $R^1$ --.

Signed and Sealed this

Twenty-first Day of October, 2003

JAMES E. ROGAN
*Director of the United States Patent and Trademark Office*